United States Patent
Fischer et al.

(10) Patent No.: US 7,003,323 B2
(45) Date of Patent: Feb. 21, 2006

(54) RADIO SYSTEM, ANTENNA ARRANGEMENT AND POLARIZATION MODULATOR FOR GENERATING A TRANSMIT SIGNAL WITH CHANGING POLARIZATION

(75) Inventors: Georg Fischer, Bavaria (DE); Frank Gerhard Ernst Obernosterer, Weissenohe (DE)

(73) Assignee: Lucent Technologies Inc., Murray Hill, NJ (US)

( * ) Notice: Subject to any disclaimer, the term of this patent is extended or adjusted under 35 U.S.C. 154(b) by 796 days.

(21) Appl. No.: 09/948,413

(22) Filed: Sep. 7, 2001

(65) Prior Publication Data

US 2002/0034968 A1    Mar. 21, 2002

(30) Foreign Application Priority Data

Sep. 20, 2000   (EP) .................................. 00308196

(51) Int. Cl.
*H04M 1/00* (2006.01)
(52) U.S. Cl. ................................. 455/562.1; 455/575.7
(58) Field of Classification Search ................ 455/522, 455/561, 562.1, 575.7, 121; 370/509, 510, 370/512; 375/130, 132, 133, 140, 141, 147
See application file for complete search history.

(56) References Cited

U.S. PATENT DOCUMENTS

| 5,265,105 | A | * | 11/1993 | Iwane | 375/365 |
| 5,280,631 | A | | 1/1994 | Nakahi | |
| 5,592,177 | A | | 1/1997 | Barrett | 342/361 |
| 5,943,372 | A | | 8/1999 | Gans | |
| 6,067,053 | A | * | 5/2000 | Runyon et al. | 343/797 |
| 6,889,061 | B1 | * | 5/2005 | Shapira et al. | 455/562.1 |

FOREIGN PATENT DOCUMENTS

EP    0 479 744 A1    5/1991
WO    WO 97/49199    12/1997

\* cited by examiner

*Primary Examiner*—Fan Tsang
*Assistant Examiner*—Aung T. Win

(57) ABSTRACT

Improved frequency utilization in a radio network is achieved by using a radio system with a plurality of base stations, which respectively have at least one transmitter and one receiver, each base station being assigned at least one dual-polarized antenna. More efficient utilization of the available frequency band, and consequently a reduction in the cluster size, is made possible by the dual-polarized antenna being assigned a polarization modulator for changing at predetermined points in time the polarization state of a transmit signal to be transmitted.

3 Claims, 2 Drawing Sheets

RADIO SYSTEM, ANTENNA ARRANGEMENT AND POLARIZATION MODULATOR FOR GENERATING A TRANSMIT SIGNAL WITH CHANGING POLARIZATION

CROSS REFERENCE TO RELATED APPLICATION

This application claims priority of European Application No. 00308196.5 filed on Sep. 20, 2000.

BACKGROUND OF THE INVENTION

1. Field of the Invention

The invention relates to a radio system, in particular a mobile radio system.

2. Description of the Related Art

The recent sharp increase in the number of mobile radio subscribers and the provision of new services in mobile radio have caused mobile radio networks, such as the GSM network for example, to approach the limits of their capacity. As is known, in the GSM network, traffic channels are used for the transmission of user data and signalling channels are used for the control and management of a mobile radio network. However, the signalling load in a mobile radio network is very high, since information has to be constantly exchanged over the air interface, even when no connection has been set up between a base station and a mobile station. An important signalling channel is represented here by the so-called broadcast control channel, also known as the BCCH channel, over which for example radio channel configurations, synchronizing information and identifications for registration are sent to all the mobile stations of a cell. Such a BCCH channel may take up as much as half of the available frequency spectrum of a cell, which is then of course no longer available for traffic channels. To allow better utilization of the spectrum reserved for a cell, it is generally known to subject the individual traffic channels when need be to a frequency hopping process, in which the carrier frequency for a traffic channel is changed at a predetermined regular rate. The frequency hopping process cannot be used, however, for a BCCH channel, since the BCCH channel is required for measurements of the receiving field strength and selection of the strongest cell. This has the result that the distance between cells in which the same BCCH carrier frequency is being used is much greater than the distance between cells in which the same traffic carrier frequency is being used. For example, the cluster size for a BCCH channel of a GSM network is 12 to 21 cells, whereas for traffic channels a cluster size of 3 to 9 cells is entirely adequate. The cluster size is understood here as meaning the number of cells among which the available frequencies are divided.

However, there have previously been no proposed ways of making more efficient use of the available carrier frequencies for signalling channels in the manner possible with the aid of the frequency hopping process for traffic channels.

SUMMARY OF THE INVENTION

The invention is therefore based on the object of providing a radio system, an antenna arrangement and a polarization modulator with which the frequencies available for a radio network can be used more efficiently, in particular with regard to signalling channels, and consequently the cluster size of a radio network can be reduced.

The basic concept of the invention is to be seen in the idea of using instead of the frequency hopping process a so-called polarization hopping process, with which the polarization state of a transmit signal can be changed, preferably on a cyclical basis. If polarization hopping is used for BCCH channels, the cluster size can be significantly reduced and consequently the frequency spectrum available in a cell can be assigned to a greater number of traffic channels.

This is so because, as is known, the frequency hopping process has the result that channels with different mid frequencies have fading responses that are independent of one another as long as the frequency hops are large enough. This response is obtained even if, instead of frequency hops, different polarization states are used for a radio link. For example, a data block of a GSM network comprises four data bursts, it being intended for the fading response of the channels for each of the four bursts to be independent of one another. This condition can therefore be satisfied both by different frequency hops and by different changes of the polarization states.

A GSM mobile radio system is disclosed, which comprises a plurality of base stations, which have at least one transmitter and one receiver, with each base station being assigned at least one dual-polarized antenna. The dual-polarized antenna may be a cross-polarized antenna. According to the invention, the dual-polarized antenna is assigned a polarization modulator for changing at predetermined points in time the polarization state of a transmit signal to be transmitted.

To allow already existing base stations to continue to be used, the dual-polarized antenna and the polarization modulator together form a module which can be connected to the base station.

The polarization modulator expediently activates the dual-polarized antenna with the transmit signal to be transmitted in such a way that the polarization of the signal to be transmitted changes on a cyclical basis between typically four different polarization states.

If a GSM mobile radio system is concerned, in which the signals are transmitted in so-called TDMA frames with eight time slots, the points in time for changing the polarization state are determined by a clock generator in dependence on the TDMA frames or the time slots within a TDMA frame.

Since the dual-polarized antenna is used both for the transmitting direction and for the receiving direction, transmitter/receiver filters are provided, in a manner known per se, at corresponding locations.

An antenna arrangement is disclosed with at least one dual-polarized antenna, which is respectively assigned a polarization modulator for changing at predetermined points in time the polarization state of a transmit signal to be transmitted.

A polarization modulator is discussed for use in a radio system, said modulator generating a plurality of polarization states for a transmit signal in dependence on an applied clock signal.

BRIEF DESCRIPTION OF THE DRAWINGS

The invention is explained in more detail below on the basis of an exemplary embodiment in conjunction with the attached drawings, in which.

DETAILED DESCRIPTION OF THE INVENTION

Figure 1:
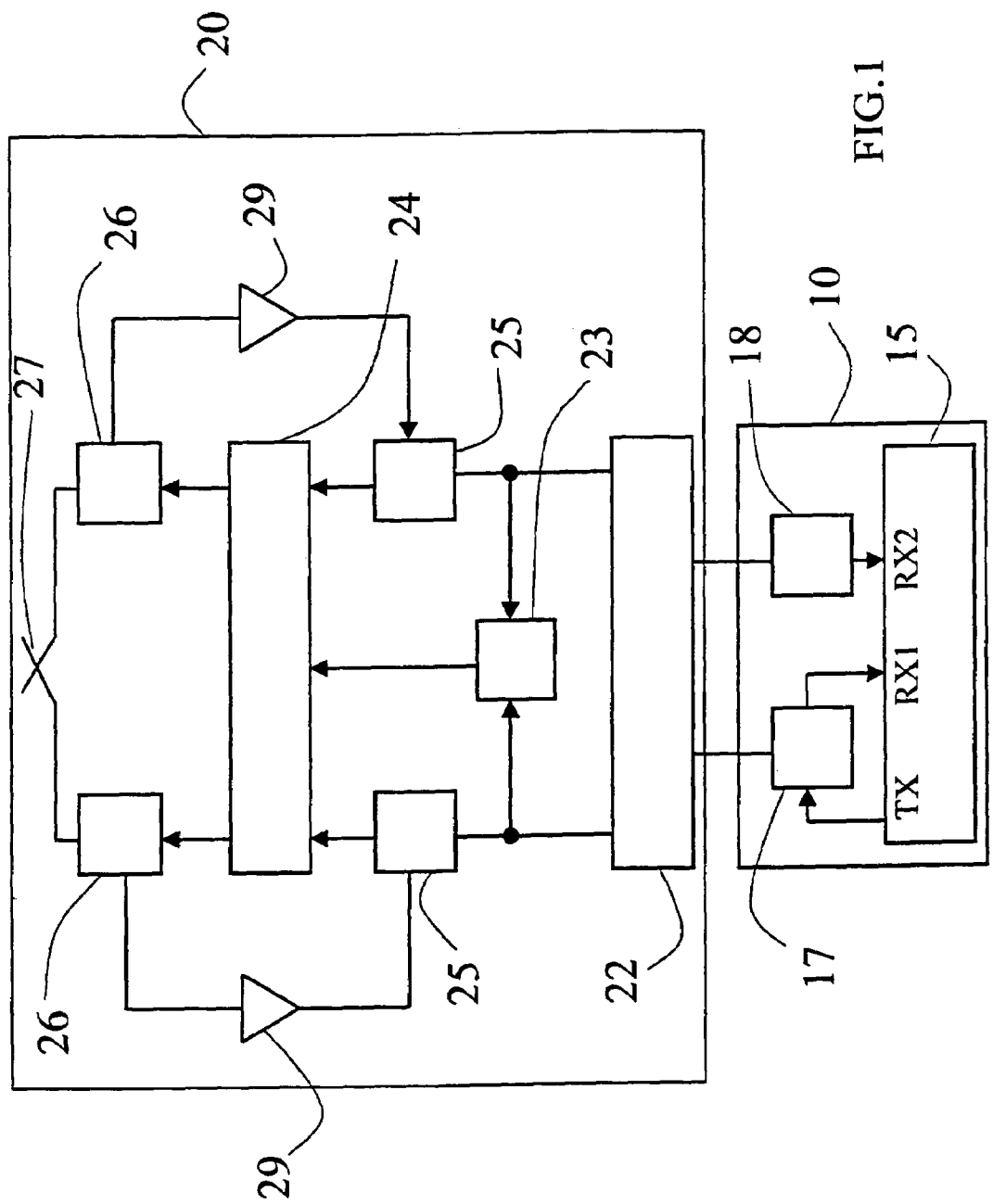
FIG. 1 shows the block diagram of a base station to which an antenna arrangement according to the invention is assigned, and FIGS. 2a–d respectively show an equivalent circuit of the polarization modulator shown in FIG. 1 for four different polarization states.

Schematically represented in FIG. 1 is a base station, for example of a GSM mobile radio network, denoted generally by 10. The base station 10 has, in a way known per se, inter alia, a transceiver 15, which comprises for example a transmitter TX and two receivers RX1, RX2 for diversity reception. Of course, further transceivers may be implemented in the base station. In the present example, the transmitter TX and the receiver RX1 are connected to a duplexer 17 for separating the transmitting direction and receiving direction. The receiver RX2 is connected to a bandpass filter 18.

FIG. 1 also shows an antenna arrangement, denoted generally by 20, which has a d.c. diplexing filter and a power supply device 22. The d.c. diplexing filter ensures that only the RF transmit power is allowed through by the transceiver 15. The antenna arrangement 20 is designed as a separate device from the base station 10 and is connected via the d.c. diplexing filter and power supply device 22 to the duplexer 17 and the bandpass filter 18 of the base station 10. A clock-recovery and control circuit 23 implemented in the antenna arrangement 20 has two inputs, which are connected to the d.c. diplexing filter and supply device 22. The output of the clock-recovery and control circuit 23 is connected to a polarization modulator 24, which is explained in further detail below. The clock-recovery and control circuit 23 can generate, for example from a TDMA frame, a control signal for the polarization modulator 24. The clock-recovery and control circuit 23 is designed in such a way for this that it recovers the burst clock from the fluctuations of the envelope of the RF transmit power of a TDMA frame. This is so because, as is known, the data to be transmitted are transmitted as a data burst in the time slots of a TDMA frame. For the transmission of a data burst, the transmit power is raised at the beginning of each time slot of a TDMA frame and lowered again at the end of the time slot or data burst. The clock-recovery and control circuit 23 recovers the burst clock rate from this variation in the output and it is used as the clock signal for the polarization modulator 24. In time with the burst clock rate, the polarization modulator 24, in connection with a dual-polarized antenna 27, changes the polarization states of the signal to be transmitted. In the exemplary embodiment, a cross-polarized antenna is used as the dual-polarized antenna.

Connected to a second and third input of the polarization modulator 24 there is respectively a transmitter/receiver filter 25, which in turn are respectively connected to a port of the d.c. diplexing filter and power supply device 22. The two transmitter/receiver filters 25 are respectively connected via a low-noise preamplifier 29 to a further transmitter/receiver filter 26. The two output signals of the polarization modulator 24 are fed via the two transmitter/receiver filters 26 to the cross-polarized antenna 27. The transmitter/receiver filters 25 and 26 are required, for example, whenever the polarization modulator 24 is realized by switching diodes. This is so because the switching diodes generate harmonic oscillations which fall within the receiving band and may consequently disturb the receivers RX1 and RX2.

At this point it should be briefly noted that the clock-recovery and control circuit 23, which generates the switching signal for the polarization modulator 24, may be substituted by a time-slot clock generator (not shown) already present in the base station 10, the output signal of which is fed to the polarization modulator 24.

As already mentioned, the polarization modulator 24 ensures that the polarization state of the signal to be transmitted changes at the beginning of each data burst.

FIGS. 2a–2d respectively show an equivalent circuit diagram of the polarization modulator 24, each equivalent circuit diagram symbolizing a specific polarization state. According to FIGS. 2a–2d, the polarization modulator 24, in connection with the cross-polarized antenna 27, may generate a linearly (+45°) polarized transmit signal, a linearly (−45°) polarized transmit signal, a circularly (anticlockwise) polarized transmit signal and a circularly (clockwise) polarized transmit signal. Depending on implementation, the polarization modulator 24 may hop randomly back and forth between individual polarization states or all the polarization states, or else provide the individual polarization states on a cyclical basis in connection with the cross-polarized antenna 27.

In the present example, the equivalent circuits respectively have two inputs and two outputs, it being possible for each input to be assigned to a separate transmitter. This means that, according to FIG. 2a for example, a signal with a 45° linearly polarized state is generated if a transmitter is connected at the left-hand input. Conversely, a signal with a −45° linearly polarized state is emitted at the cross-polarized, antenna 27 if a transmitter is connected at the right-hand input. The polarization modulator 24 has a converse behaviour with regard to FIG. 2b.

Figure 2A:
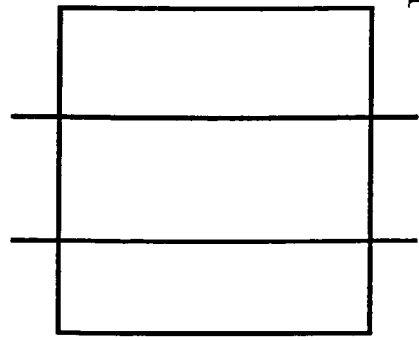
Figure 2B:
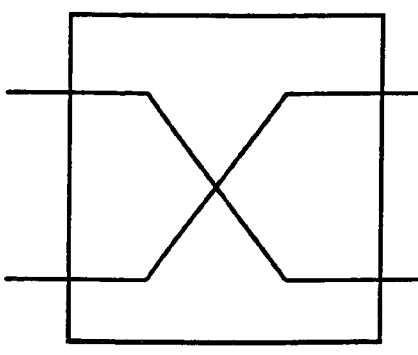
Figure 2C:
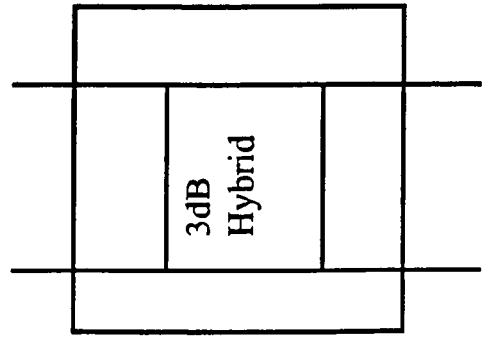
Figure 2D:
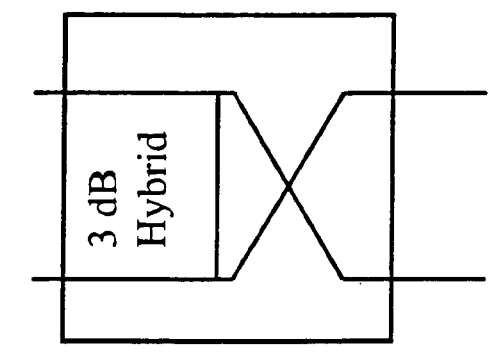

According to the equivalent circuit diagram shown in FIG. 2c, a transmit signal applied to the left-hand input is split into two 90°-shifted signal components and fed to the cross-polarized antenna 27, the emitted transmit signal forming an anticlockwise, circularly polarized transmit signal. If, however, a transmit signal is applied to the right-hand input of the polarization modulator 24, it is split into two 90°-shifted signal components and fed to the cross-polarized antenna 27, the emitted transmit signal forming a clockwise, circularly polarized transmit signal. The polarization modulator 24 has a converse behaviour if the equivalent circuit shown in FIG. 2d is used.

With the antenna arrangement 20 described it is now possible to reduce significantly the cluster size of a GSM network for BCCH channels.

What is claimed is:

1. A base station, comprising:
   at least one transmitter;
   at least one receiver; and being assigned
   at least one dual-polarized antenna, wherein the at least one dual-polarized antenna is assigned a polarization modulator for changing at predetermined points in time the polarization state of a transmit signal to be transmitted; the polarization modulator being connected to a clock generator which fixes the points in time for changing the polarization state;
   wherein the dual-polarized antenna and the polarization modulator form a module arranged separately from the base station;
   the clock generator being within the module and generating a clock signal from the fluctuations of an envelope of RF transmit power of a TDMA frame.

2. The base station of claim 1, wherein the polarization modulator provides on a cyclical basis four different polarization states for the transmit signal to be transmitted.

3. The base station of claim 1, wherein the dual-polarized antenna is a cross-polarized antenna.

* * * * *